United States Patent
Mavridis et al.

(10) Patent No.: US 7,230,054 B2
(45) Date of Patent: Jun. 12, 2007

(54) POLYMER RESINS WITH IMPROVED ENVIRONMENTAL STRESS CRACK RESISTANCE

(75) Inventors: Harilaos Mavridis, Cincinnati, OH (US); Sameer D. Mehta, Mason, OH (US); Mark P. Mack, West Chester, OH (US); Philip J. Garrison, Houston, TX (US); Michael W. Lynch, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 186 days.

(21) Appl. No.: 10/880,263

(22) Filed: Jun. 29, 2004

(65) Prior Publication Data

US 2005/0288443 A1 Dec. 29, 2005

(51) Int. Cl.
  *C08L 23/00* (2006.01)
(52) U.S. Cl. .................. 525/240; 525/480; 525/502 R
(58) Field of Classification Search ................ 525/240, 525/502 R, 480
See application file for complete search history.

(56) References Cited

U.S. PATENT DOCUMENTS

| | | | | |
|---|---|---|---|---|
| 3,907,759 | A | 9/1975 | Okada et al. .............. 260/88.2 |
| 5,382,630 | A | 1/1995 | Stehling et al. ............. 525/240 |
| 5,534,472 | A | 7/1996 | Winslow et al. ............ 502/116 |
| 5,744,551 | A | 4/1998 | Kupperblatt et al. ........ 525/240 |
| 5,866,863 | A | 2/1999 | Cole ........................ 200/38 R |
| 6,063,881 | A | 5/2000 | Bennett ....................... 526/161 |
| 6,100,351 | A | 8/2000 | Sun et al. ................. 526/125.3 |
| 6,171,993 | B1 | 1/2001 | Mavridis et al. ............ 502/103 |
| 6,218,472 | B1 | 4/2001 | Debras et al. .............. 525/191 |
| 6,423,792 | B1 | 7/2002 | Debras et al. .............. 526/106 |
| 6,441,096 | B1 | 8/2002 | Backman et al. ........... 525/240 |
| 6,486,270 | B1 | 11/2002 | Garrison et al. .............. 526/65 |
| 6,506,866 | B2 | 1/2003 | Jacobsen et al. ............ 526/348 |
| 6,649,698 | B1 | 11/2003 | Mehta ........................ 525/191 |
| 6,693,154 | B2 | 2/2004 | Liu et al. .................... 526/134 |
| 6,713,585 | B1 | 3/2004 | Mavridis et al. ............ 526/352 |

FOREIGN PATENT DOCUMENTS

| | | |
|---|---|---|
| AU | 764796 | 8/2003 |
| EP | 0517222 A2 | 12/1992 |
| EP | 0735090 A1 | 10/1996 |
| EP | 0989141 A1 | 3/2000 |
| EP | 1083183 A1 | 3/2001 |
| EP | 1201713 A1 | 5/2002 |
| WO | WO 03/093363 | 11/2003 |

OTHER PUBLICATIONS

R. Shroff et al., *J. Appl. Polym. Sci.* 57 (1995) 1605.
C. Shan et al., *Polymer* 44 (2003) 177.
K-J Chu et al., *Macromol. Chem. Phys.*, 201 (2000) 340.
K-J Chu et al., *Macromol. Chem. Phys.* 200 (1999) 2372.
C. Shan et al., *Macromol. Chem. Phys.* 201 (2000) 2195.
J. D. Kim et al., *J. Polym. Sci. A*, 38 (2000) 1427.
C. Shan et al., *J. Polym, Sci. A*. 40 (2002) 4426.
J. Soares et al., *J. Polym, Sci. B*, 38 (2000) 1267.
M. Zhang et al., *Polymer* 42 (2001) 3067.
C. Shan et al., *Polymer* 43 (2002) 767.
C. Shan et al., *Polymer* 43 (2002) 7345.

*Primary Examiner*—Duc Truong
(74) *Attorney, Agent, or Firm*—Jonathan L. Schuchardt

(57) ABSTRACT

Resins comprising a relatively high-density, low-molecular-weight polyethylene component and a relatively low-density, high-molecular-weight ethylene copolymer component and methods of making the resins are disclosed. The rheological polydispersity of the high-density component exceeds that of either the resin or the low-density component. The resins are valuable for making films, sheets, coatings, pipes, fibers, and molded articles having a favorable balance of good stiffness and excellent environmental stress crack resistance.

9 Claims, No Drawings

7,230,054 B2

POLYMER RESINS WITH IMPROVED ENVIRONMENTAL STRESS CRACK RESISTANCE

FIELD OF THE INVENTION

The invention relates to thermoplastic polymer resins useful for making films, fibers, coatings, molded articles, and other products.

BACKGROUND OF THE INVENTION

Polyolefins, especially polyethylenes, are important thermoplastics with many uses. Traditionally, polyolefins have been manufactured using slurry, solution, and gas-phase polymerization processes and Ziegler-Natta catalysts. In recent years, polyolefins made using single-site catalysts, including metallocenes, have been commercialized.

Polyolefin customers continue to seek resins that have both high stiffness and good environmental stress crack resistance (ESCR), especially for molding and extrusion applications. Unfortunately, for resins made with similar catalyst and process technologies, at a given melt index, resins with higher stiffness usually have poorer ESCR.

The molecular weight distribution of a polymer resin influences its processability and physical properties. The most common measure of molecular weight distribution is $M_w/M_n$, the ratio of weight average to number average molecular weight, which is usually determined by gel permeation chromatography (GPC). Resin properties and processability are also influenced by long-chain branching and comonomer distribution, and this information is not readily ascertained from GPC results.

Valuable information about polydispersity that takes into account differences in long-chain branching is available from rheological measurements on molten resins, i.e., from "rheological polydispersity." An overall polydispersity ratio (PDR) that uses complex viscosity data as a function of complex modulus rather than frequency can be measured. An additional measure of rheological polydispersity is ER, which is determined from plots of storage modulus (G') versus loss modulus (G") and is a measure of high-molecular-weight-end polydispersity. Both PDR and ER are conveniently determined as discussed in R. Shroff and H. Mavridis, *New Measures of Polydispersity from Rheological Data on Polymer Melts*, J. Appl. Polym. Sci. 57 (1995) 1605. In spite of the availability of this tool, differences in rheological polydispersity have not often been exploited. For a notable exception, however, see U.S. Pat. No. 6,713,585, in which ER measurements and their shifts upon pelletization were shown to be important for identifying and characterizing new ethylene copolymer resins.

Colin Li Pi Shan et al. studied the rheological properties of HDPE/LLDPE reactor blends having bimodal microstructures (see *Polymer* 44 (2003) 177). Some of the blends disclosed have a relatively high-molecular-weight (HMW), low-density copolymer component and a relatively low-molecular-weight (LMW), high-density polyethylene homopolymer component (see Table 1). FIG. 6 of the reference shows three rheology plots of G' versus G". From this data, it is apparent that the rheological polydispersity of the LMW component cannot be greater than that of either the HMW component or that of a blend of the two components. As is explained in Shroff and Mavridis, supra, at page 1621 and FIG. 2, "at a given level of G", the broader the spectrum, the higher the G'." A "broader spectrum" is synonymous with a higher rheological polydispersity. In Li Pi Shan's FIG. 6 plots, the resin component with relatively low G' values therefore has a relatively low rheological polydispersity. In the top two plots, which show a HMW low-density copolymer, a LMW high-density homopolymer, and blends of the two, the LMW homopolymer has a rheological polydispersity less than that of either the HMW copolymer or a blend of the HMW and LMW components.

Commercial polyolefin resins are commonly produced in a single reactor with a Ziegler-Natta catalyst, ethylene, enough hydrogen to control molecular weight, and enough comonomer to drive density down to a targeted value. The resulting resins have more of the comonomer typically incorporated into the lower molecular weight component of the resin. Dual reactor configurations are also used. Even with two parallel reactors, however, manufacturers often choose to make products of similar density and melt index in each reactor and then blend them to give resins with narrow molecular weight distribution that are valuable for injection molding (see Comparative Examples 2, 4, and 6 below). Usually, these resins lack optimum ESCR.

Still needed in the industry are resins that have a desirable balance of high stiffness and good ESCR. Particularly needed is a better appreciation of how differences in rheological polydispersity might be exploited to arrive at the improved resins. Methods for making the resins using readily available catalysts, equipment, and processes are also needed.

SUMMARY OF THE INVENTION

The invention is a resin comprising a relatively high-density, low-molecular-weight polyethylene component and a relatively low-density, high-molecular-weight ethylene copolymer component. The rheological polydispersity of the high-density component exceeds that of either the resin or the low-density component. The invention includes films, sheets, coatings, pipes, fibers, and molded articles made from the resins. It also includes series and parallel-reactor methods for making the resins. We surprisingly found that resins of the invention exhibit a favorable balance of good stiffness and excellent environmental stress crack resistance.

DETAILED DESCRIPTION OF THE INVENTION

Resins of the invention incorporate a polyethylene component that has a relatively high density and a relatively low molecular weight when these values are compared with those of the low-density, high-molecular-weight ethylene copolymer component. Preferably, the high-density component has a density (ASTM D1505) within the range of about 0.940 g/cm$^3$ to about 0.975 g/cm$^3$, more preferably from about 0.950 g/cm$^3$ to about 0.970 g/cm$^3$. Preferably, the low-density component has a density within the range of about 0.910 g/cm$^3$ to about 0.950 g/cm$^3$, more preferably from about 0.925 g/cm$^3$ to about 0.945 g/cm$^3$.

Molecular weights of the resin components are generally inversely related to their melt indices. Thus, the high-molecular-weight component has a relatively low melt index, and the low-molecular-weight component has a relatively high melt index (ASTM D1238, 2.16 kg load). Preferably, the high-molecular-weight component has melt index less than about 100 g/10 min, more preferably less than about 20 g/10 min. Preferably, the low-molecular-weight component has melt index within the range of about 1 to about 1000 g/10 min, more preferably from about 10 to about 400 g/10 min.

The high-density, low-molecular-weight component is a polyethylene. It is preferably a homopolymer of ethylene, but it can incorporate ethylene units and a minor proportion of olefin comonomer units, so long as its density remains high relative to that of the low-density component. When the polyethylene component incorporates a comonomer, the comonomer is preferably propylene, 1-butene, 1-hexene, 1-octene, 4-methyl-1-pentene, or mixtures thereof.

The low-density, high-molecular-weight component is an ethylene copolymer, i.e., it incorporates units from both ethylene and at least one olefin comonomer. Preferred comonomers are propylene, 1-butene, 1-hexene, 1-octene, 4-methyl-1-pentene, and the like, and mixtures thereof.

Both components can incorporate comonomer; however, in preferred resins of the invention, the high-molecular-weight component incorporates a greater weight percentage of comonomer than the low-molecular-weight component. The combined resin preferably has a density within the range of about 0.93 to about 0.96 g/cm$^3$, more preferably from about 0.940 to about 0.955 g/cm$^3$. The melt index of the combined resin is preferably from about 0.02 to about 100 g/10 min., more preferably from about 0.05 to about 50 g/10 min.

In resins of the invention, the rheological polydispersity of the high-density component exceeds that of either the low-density component or the combined resin components (i.e., "the resin"). By "rheological polydispersity," we mean values of polydispersity derived from rheological measurements on molten resins. One suitable measure of polydispersity is PDR, which is an overall polydispersity ratio that uses complex viscosity data as a function of complex modulus. Another suitable measure of rheological polydispersity is ER, which is determined from plots of storage modulus (G') versus loss modulus (G") and is a measure of high-molecular-weight-end polydispersity. Both PDR and ER are conveniently determined as discussed in R. Shroff and H. Mavridis, *New Measures of Polydispersity from Rheological Data on Polymer Melts, J. App. Polym. Sci.* 57 (1995) 1605. See also U.S. Pat. Nos. 6,171,993 and 5,534,472, the teachings of which are incorporated herein by reference.

As noted above, the rheological polydispersity of the high-density component exceeds that of either the low-density component or the combined resin components. Table 1 below shows blends of a high-density, low-molecular-weight component (resin A) with a low-density, high-molecular-weight component (resin B or C). Comparing blends with the high-density component alone, notice that the PDR (4.27), and ER (1.52) values measured for resin A exceed those of each of the blends (Tables 2 and 3).

Moreover, for each of Examples 1, 3, and 5, compare the values of ER and PDR reported in Table 4 for the high-density ("A" reactor) components versus the same values for either the low-density ("B" reactor) component (Table 5) or the combined resin (Table 6). The values in Table 4 exceed the corresponding values reported in either of Tables 5 or 6.

Resins of the invention have excellent environmental stress crack resistance (ESCR) as determined by ASTM D1693. Typically, the ESCR value is measured in either 10% or 100% Igepal® solution. In general, resins of the invention provide enhanced ESCR compared with that of conventional ethylene copolymer resins of similar density and melt index. For example, in Table 6, last row, see Example 1 versus Comparative Example 2; Example 3 versus Comparative Example 4; and Example 5 versus Comparative Example 6.

In general, resins of the invention provide enhanced stiffness compared with conventional ethylene copolymer resins of similar melt index and ESCR. See, for example, the tensile yield properties in Table 3.

Resins of the invention can incorporate multiple components. Multi-component resins can be made by using multiple catalysts, multiple reactors, multiple process types, varied process conditions, or some combination of these. Preferably, a multi-component resin of the invention will be essentially free of components having both a lower weight average molecular weight ($M_w$) and a lower rheological polydispersity than that of any other resin component. In other words, the resin components with relatively low $M_w$ values are the ones with relatively high rheological polydispersities. Additionally, preferred multi-component resins of the invention will be essentially free of components having both a higher density and a lower rheological polydispersity than that of any other resin component.

Resins of the invention are useful for making articles by injection molding, blow molding, rotomolding, and compression molding. The resins are also useful for making films, extrusion coatings, pipes, sheets, and fibers. Products that can be made from the resins include grocery bags, trash bags, merchandise bags, pails, crates, detergent bottles, toys, coolers, corrugated pipe, housewrap, shipping envelopes, protective packaging, wire & cable applications, and many others.

The method for making the resins is not particularly critical. As will be apparent to those skilled in the art, numerous methods or combinations of methods can be employed. For example, the resins can be made by solution, slurry, or gas-phase techniques, or by a combination of these. Some suitable methods will employ a single reactor; others will use multiple reactors that are operated in series or in parallel. Some methods can use a single catalyst; others will require multiple catalysts. The catalysts can be Ziegler-Natta, single-site, late transition metal, modified varieties of one or the other (e.g., an organosilane or organosiloxane-modified Ziegler-Natta catalyst), or some combination of these. For examples of silane-modified Ziegler-Natta catalysts, see U.S. Pat. Nos. 6,486,270 and 6,100,351, the teachings of which are incorporated herein by reference.

One convenient way to make the resins utilizes two reactors, preferably slurry stirred-tank reactors, that operate in parallel. Ethylene is polymerized, optionally with a comonomer, in a first reactor to produce a relatively high-density, low-molecular-weight polyethylene component. Additional ethylene is copolymerized with a 1-olefin in a second reactor to produce a relatively low-density, high-molecular-weight ethylene copolymer component. The high and low-density components are then blended to produce a resin wherein the rheological polydispersity of the high-density component exceeds that of either the low-density component or the combined resin. Preferably, catalyst, activators, ethylene, comonomers, diluent, hydrogen, and other components are fed to each of two slurry stirred-tank reactors. The resulting polymer slurries are combined and concentrated, and the polymer product is dried, compounded with other additives, and pelletized.

Another convenient method uses two reactors, preferably slurry stirred-tank reactors, that are arranged in series. Ethylene is polymerized, optionally with a comonomer, in a first reactor to produce a relatively high-density, low-molecular-weight polyethylene component. The high-density component is then transferred to a second reactor where additional ethylene and 1-olefin are copolymerized in the presence of the high-density component. Polymerization in the second reactor produces a relatively low-density, high-molecular-weight ethylene copolymer component. Overall, the rheological polydispersity of the high-density component exceeds that of either the low-density component or the combined resin. Preferably, catalyst is fed only to the first reactor. In this case, the high and low-molecular-weight components are produced on the same catalyst particles and an intimate mix of the components results. Ethylene, comonomers, diluent, hydrogen, and other components such as cocatalysts can be fed to either reactor. The resulting polymer slurry is concentrated, dried, compounded, and pelletized as described earlier.

In yet another method, the reactors are arranged in series, but a relatively low-density, high-molecular-weight ethylene copolymer component is produced in the first reactor, and a relatively high-density, low-molecular-weight polyethylene is produced in the second reactor. Again, the rheological polydispersity of the high-density component exceeds that of either the low-density component or the combined resin. Again, an intimate product mix results if catalyst is fed only to the first reactor.

As noted earlier, resins of the invention can be made using a variety of catalysts, including Ziegler-Natta, single-site, late transition metal, modified varieties of these, or combinations thereof. As those skilled in the art will appreciate, not all catalysts or combinations will be suitable for making resins having the required attributes. The catalyst/method combination must provide a resin in which the rheological polydispersity of the high-density component exceeds that of either the low-density component or the combined resin.

In one suitable parallel reactor approach, a Ziegler-Natta catalyst is used in the first reactor to make a high-density, low-molecular-weight component, and a single-site catalyst is used to make a low-density, high-molecular-weight component. In another suitable parallel reactor method, a Ziegler-Natta catalyst is used to make the high-density polyethylene component, and a silane-modified Ziegler-Natta catalyst (or another Ziegler-Natta catalyst capable of making a resin component with narrow rheological polydispersity) is used to make the low-density copolymer component (see Examples 1, 3, and 5, below). In yet another parallel reactor method, a late transition metal catalyst (for examples, see U.S. Pat. Nos. 5,866,863, 6,063,881, and 6,693,154, the teachings of which are incorporated herein by reference) is used to make the high-density polyethylene component, and a single-site catalyst is used to make the low-density ethylene copolymer component. In yet another approach, the high-density resin is made using a single-site catalyst capable of making a resin having relatively broad rheological polydispersity, and the low-density resin is made using a different single-site catalyst that is capable of making a resin having relatively narrow rheological polydispersity.

Reaction temperatures for the polymerization reactors preferably range from about 40° C. to about 300° C., more preferably from about 50° C. to about 250° C., and most preferably from about 60° C. to about 120° C. Selection of reactor temperature depends on catalyst type and concentration, the targeted melt index and density of the polymer, and many other factors. Pressures preferably range from about 2 to about 200 atmospheres, more preferably from about 3 to about 150 atmospheres, and most preferably from about 4 to about 30 atmospheres.

The following examples merely illustrate the invention. Those skilled in the art will recognize many variations that are within the spirit of the invention and scope of the claims.

Rheological Measurements and Calculations

Rheological measurements are performed in accord with ASTM 4440-95a, which measures dynamic rheology data in the frequency sweep mode. A Rheometrics ARES rheometer is used, operating at 150-190° C., in parallel plate mode under nitrogen to minimize sample oxidation. The gap in the parallel plate geometry is typically 1.2-1.4 mm, the plate diameter is 25 mm or 50 mm, and the strain amplitude is 10-20%. Frequencies range from 0.0251 to 398.1 rad/sec.

ER is determined by the method of Shroff et al., supra (see also U.S. Pat. No. 5,534,472 at col. 10, lines 20-30). Thus, storage modulus (G') and loss modulus (G") are measured. The nine lowest frequency points are used (five points per frequency decade) and a linear equation is fitted by least-squares regression to log G' versus log G". ER is then calculated from:

$$ER = (1.781 \times 10^{-3}) \times G'$$

at a value of $G''=5,000$ dyn/cm$^2$. As a skilled person will recognize, when the lowest G" value is greater than 5,000 dyn/cm$^2$, the determination of ER involves extrapolation. The ER values calculated then will depend on the degree on nonlinearity in the log G' versus log G" plot.

The temperature, plate diameter, and frequency range are selected such that, within the resolution of the rheometer, the lowest G" value is close to or less than 5,000 dyn/cm$^2$. The examples below use a temperature of 190° C., a plate diameter of 50 mm, a strain amplitude of 10%, and a frequency range of 0.0251 to 398.1 rad/sec.

Base Resin Data and Test Methods

Table 1 shows properties of base resins used to make polyolefin blends. Resin A is Alathon® M6138, a relatively low-molecular-weight HDPE resin that is commercially available from Equistar Chemicals, LP. Resin B is Petrothene® GA601-030, a relatively high-molecular-weight LLDPE resin, also from Equistar, that is produced with a Ziegler-Natta catalyst. Resin C is Exceed™ 1018, a metallocene-based LLDPE resin that is commercially available from ExxonMobil.

Test methods used: Melt index and high-load melt index (MI, 2.16 kg load; and HLMI, 21.6 kg load): ASTM D1238. Density: ASTM D1505. Tensile yield: ASTM D638. ESCR: ASTM D1693. In one set of ESCR measurements, rectangular test samples are first notched and then stressed by bending. They are then immersed in a highly active surfactant (10% or 100% Igepal® solution) at 50° C. The time (in days) for 50% of the samples to fail is reported in Table 3. The ESCR of thinner specimens is measured somewhat differently. In this case, a 50-mil sample is immersed in 10% Igepal® solution at 50° C., and the time (in hours) for the sample to fail is noted (see Table 6).

PDR or "polydispersity ratio" is calculated as reported by Shroff and Mavridis, *J. Appl. Polym. Sci.* 57 (1995) 1605.

$\eta^*_{100}$ is the complex viscosity (in poise) measured at 100 rad/sec.

Blend Properties

HDPE (Alathon® M6138) pellets are first dry blended (weight ratios are reported in the tables) with LLDPE (Petrothene® GA601-030 or Exceed™ 1018) pellets and then melt blended on a Killion single screw extruder. The extruder temperature profile for all the formulations is set at 350° F. (Zone 1), 400° F. (Zone 2), 420° F. (Zone 3) and 425° F. (Die). Extruder speed is kept at 70 rpm for all the formulations. The properties of the blends are compared with those of Resin D, Petrothene® GA652-762, a commercial rotomolding resin that is available from Equistar Chemicals, LP. As Table 2 shows, all of the blends have melt indices that resemble those of the commercial resin. Table 3 compares ER, ESCR, and tensile yield (i.e., stiffness) values. The results demonstrate that although the blends have similar melt indices compared with the commercial resin, the blends have higher stiffness and superior ESCR. This is true whether the LLDPE component of the blend is produced using a metallocene (Resin C) or a Ziegler-Natta catalyst (Resin B).

EXAMPLES 1, 3, AND 5

Resin Preparation: General Procedure

A Ziegler-Natta catalyst slurry, prepared according to the method of U.S. Pat. No. 3,907,759, is diluted with hexane to the desired titanium concentration. The dilute catalyst slurry is fed continuously along with triethylaluminum (TEAL), hexane, 1-butene, hydrogen, and ethylene to a first reactor ("the A reactor") to make a relatively low-molecular-weight, high-density polyethylene resin component as shown in Table 4. The polymerizations are performed at 81° C. at the reactor pressures and vapor-space hydrogen-to-ethylene molar ratios shown in the table. The table also shows properties of the resulting resin component. A portion of the volatiles is removed from this first polymer slurry after transferring the product to a flash drum.

A relatively high-molecular-weight, low-density ethylene copolymer resin component is produced at 81° C. in a second reactor ("the B reactor") using more of the same catalyst slurry and reactants plus an optional silane modifier (see Table 5). After removing volatiles, this second polymer slurry is combined with the first polymer slurry, and the mixture is centrifuged to remove hexane. The wet cake is dried under nitrogen and compounded with a standard stabilizer package to give the finished polymer (see Table 6).

COMPARATIVE EXAMPLES 2, 4, AND 6

A similar approach is used except that the silane modifier is omitted from the B reactor, and the resins made in the A and B reactors have identical targeted melt index and density values. See Tables 4-6.

Examples 1 and C2 make final resins having targeted $MI_2=5$ and density=0.952 g/cm$^3$. Examples 3 and C4 make final resins having targeted $MI_2=7$ and density=0.952 g/cm$^3$.

TABLE 1

Base Resins

| Resin | MI (g/10 min) | HLMI (g/10 min) | Density (g/cm$^3$) | HLMI/MI | ER | PDR | $\eta^*_{100}$ (poise) | mp (° C.) |
|---|---|---|---|---|---|---|---|---|
| A | 3.85 | 120 | 0.962 | 31 | 1.02 | 4.27 | 7.67 × 10$^3$ | 133 |
| B | 0.95 | 27 | 0.919 | 28 | 0.79 | 3.73 | 1.79 × 10$^4$ | 124 |
| C | 1.10 | 18 | 0.920 | 16 | 0.17 | 2.05 | 2.16 × 10$^4$ | 119 |

TABLE 2

Polyolefin Blend Properties

| Blend (wt:wt) | MI (g/10 min) | HLMI (g/10 min) | Density (g/cm$^3$) | HLMI/MI | PDR | $\eta^*_{100}$ (poise) |
|---|---|---|---|---|---|---|
| A/C (70:30) | 2.35 | 60 | 0.948 | 25 | 2.93 | 1.23 × 10$^4$ |
| A/C (65:35) | 2.24 | 54 | 0.946 | 24 | 2.82 | 1.27 × 10$^4$ |
| A/B (65:35) | 2.15 | 70 | 0.946 | 33 | 4.17 | 1.09 × 10$^4$ |
| D | 2.07 | 51 | 0.942 | 25 | 3.04 | 1.29 × 10$^4$ |

TABLE 3

Polyolefin Blend Properties

| Blend (wt:wt) | ER | ESCR (75 mil), 10% Igepal (days) | ESCR (75 mil), 100% Igepal (days) | Tensile yield (psi) |
|---|---|---|---|---|
| A/C (70:30) | 0.62 | 9 | >42 | 3730 |
| A/C (65:35) | 0.60 | 16 | >42 | 3460 |
| A/B (65:35) | 0.86 | 10 | >42 | 3250 |
| D | 0.62 | 2.2 | >42 | 3120 |

Examples 5 and C6 make final resins having targeted $MI_2=16$ and density=0.955 g/cm³. The examples of the invention have distinct high-density (low mol. wt.) and low-density (high mol. wt.) components, while the comparative examples are "single-reactor," Ziegler-Natta polyethylenes.

TABLE 4

Resin Preparation -- the "A" reactor

| | | | Example | | | |
|---|---|---|---|---|---|---|
| | 1 | C2 | 3 | C4 | 5 | C6 |
| [Ti] | $6.0 \times 10^{-5}$ | $5.0 \times 10^{-5}$ | $7.5 \times 10^{-5}$ | $5.0 \times 10^{-5}$ | $1.0 \times 10^{-4}$ | $5.0 \times 10^{-5}$ |
| Feeds[1] | | | | | | |
| catalyst slurry | 29 | 22 | 32 | 18 | 35 | 20 |
| TEAL | $6.2 \times 10^{-3}$ | $5.8 \times 10^{-3}$ | $7.4 \times 10^{-3}$ | $4.0 \times 10^{-3}$ | $1.0 \times 10^{-2}$ | $5.4 \times 10^{-3}$ |
| hexane | 174 | 183 | 170 | 183 | 167 | 185 |
| 1-butene | 0.4 | 1.0 | 0.5 | 0.8 | 0.6 | 0.9 |
| ethylene | 30 | 30 | 30 | 30 | 30 | 30 |
| Press. (psig) | 100 | 120 | 120 | 120 | 130 | 130 |
| $H_2/C_2H_4$[2] | 1.3 | 0.8 | 1.5 | 1.0 | 2.1 | 1.3 |
| Resin | | | | | | |
| $MI_2$ (g/10 min) | 16 | 4.6 | 25 | 7.6 | 67 | 16 |
| density (g/cm³) | 0.960 | 0.952 | 0.960 | 0.952 | 0.961 | 0.954 |
| ER | 1.00 | | 0.95 | | 0.97 | |
| PDR | 3.58 | | 3.26 | | 2.99 | |

[1]Parts per hour
[2]Vapor space molar ratio

TABLE 5

Resin Preparation -- the "B" reactor

| | | | Example | | | |
|---|---|---|---|---|---|---|
| | 1 | C2 | 3 | C4 | 5 | C6 |
| Feeds[1] | | | | | | |
| catalyst slurry | 15 | 26 | 15 | 20 | 25 | 24 |
| TEAL | $6.2 \times 10^{-3}$ | $5.8 \times 10^{-3}$ | $7.4 \times 10^{-3}$ | $4.0 \times 10^{-3}$ | $1.0 \times 10^{-2}$ | $5.4 \times 10^{-3}$ |
| hexane | 179 | 176 | 175 | 177 | 182 | 177 |
| 1-butene | 3.8 | 0.9 | 4.2 | 0.8 | 2.0 | 0.9 |
| ethylene | 30 | 30 | 30 | 30 | 30 | 30 |
| silane modifier | $1.1 \times 10^{-3}$ | — | $1.1 \times 10^{-3}$ | — | $1.1 \times 10^{-3}$ | — |
| Press. (psig) | 100 | 120 | 120 | 120 | 130 | 130 |
| $H_2/C_2H_4$[2] | 0.7 | 0.7 | 0.8 | 0.9 | 1.1 | 1.3 |
| Resin | | | | | | |
| $MI_2$ (g/10 min) | 2.0 | 5.1 | 2.9 | 7.1 | 7.3 | 20 |
| density (g/cm³) | 0.942 | 0.952 | 0.942 | 0.952 | 0.948 | 0.954 |
| ER | 0.41 | | 0.40 | | 0.48 | |
| PDR | 2.43 | | 2.44 | | 2.46 | |

[1]Parts per hour
[2]Vapor space molar ratio

TABLE 6

Combined Resin Properties

| | | | Example | | | |
|---|---|---|---|---|---|---|
| | 1 | C2 | 3 | C4 | 5 | C6 |
| $MI_2$ (g/10 min) | 4.9 | 5.2 | 7.2 | 7.5 | 15 | 17 |
| density (g/cm³) | 0.952 | 0.953 | 0.951 | 0.952 | 0.955 | 0.956 |
| ER | 0.65 | 0.94 | 0.64 | 0.90 | 0.88 | 0.94 |
| PDR | 3.07 | 3.66 | 2.99 | 3.40 | 3.28 | 3.27 |
| ESCR (50 mil), 10% Igepal (h) | 7.0 | 5.0 | 5.1 | 3.5 | 2.0 | 0.55 |

Resin performance needs to be compared using resins of like melt index and density. Thus, when we compare the ESCR results from Example 1 and Comparative Example 2, we see the advantage of using a two-component resin that has a relatively high-density, low-molecular-weight component (from the "A" reactor) and a relatively low-density, high-molecular-weight component (from the "B" reactor) versus the commercially available one-component resin (5 MI, 0.952 g/cm³) of Comparative Example 2. The 10% ESCR value improves from 5.0 to 7.0 hours. Similar ESCR improvements are observed when comparing other two-component resins of the invention (Examples 3 and 5) with commercial injection molding resins of like melt index and density (C4, C6).

Note that analysis of the resin of Example 1 shows rheological polydispersity measures (ER, PDR) of the high-density component in excess of that of either the low-density component or the combined resin. For example, the ER of the high-density component is 1.00, which exceeds the ER of both the low-density component (0.41) and the ER of the combined resin (0.65).

Calculating Resin Rheology: Series Reactors

When resins of the invention are produced using two parallel reactors (as shown in Examples 1, 3, and 5), each resin component is easily sampled and measured prior to combining them to determine the rheological polydispersities of the high and low-density components. Of course, the rheological polydispersity of the combined resin is thereafter also easily measured.

The situation is more complicated when a resin of the invention is produced using two reactors that are configured in series. In this case, the second resin is made, at least in part, on catalyst particles used to make the first resin. (In this context, "first resin" is the first resin component made in the series process, whether it be the high- or low-density component.) While the rheological polydispersity of the first resin made is easily determined after sampling, the second resin is not available as a separate and independent product; rather, the final resin is an intimate reactor mix of the first and second components. If the second resin is not available separately for testing, how then do we characterize its rheological polydispersity? As we show below, the rheology of the second resin can be calculated from a theoretical subtraction of the rheology of the first resin from the rheology of the "total" or "final" resin.

Blending rules for the calculation of the linear viscoelastic rheology of blends are known in the literature (see, e.g., J. P. Montfort et al., *Polymer* 19 (1978) 277). The blending rule used in the present work is:

$$(G^*(\omega))^{1/\alpha} = \phi_A \cdot (G^*_A(\omega))^{1/\alpha} + \phi_B \cdot (G_B^*(\omega))^{1/\alpha} \quad (1)$$

where $\phi$ is the volume fraction, A and B subscripts denote the blend components A and B, respectively and $G^*(\omega)$ is the complex modulus at frequency $\phi$. The exponent $\alpha$ is related to the zero-shear-viscosity versus molecular weight relationship (see W. W. Graessley in *Physical Properties of Polymers*, J. E. Mark et al., eds., 2nd ed. (1993) ACS, Washington, D.C.) and is fixed at a value of $\alpha=3.4$.

The complex modulus, $G^*(\omega)$, is a complex number related to the storage (G') and loss (G") modulus, through:

$$G^*(\omega) = G'(\omega) + i \cdot G^*(\omega) \quad (2)$$

and i is the imaginary unit number ($i^2=-1$). Alternatively, eq. (2) can be written as:

$$G^*(\omega) = |G^*(\omega)| \cdot e^{i \cdot \delta(\omega)} \text{ where} \quad (3)$$

$$|G^*(\omega)| = [G'(\omega)^2 + G''(\omega)^2]^{1/2} \quad (4a)$$

$$\delta(\omega) = \tan^{-1}\left(\frac{G''(\omega)}{G'(\omega)}\right) \quad (4b)$$

Substituting into eq. (1) and carrying out the complex algebra leads to:

$$|G^*(\omega)| = \left\{ \begin{array}{l} [\varphi_A \cdot |G^*_A|^{1/\alpha} \cdot \cos(\delta_A/\alpha) + \varphi_B \cdot |G^*_B|^{1/\alpha} \cdot \cos(\delta_B/\alpha)]^2 + \\ [\varphi_A \cdot |G^*_A|^{1/\alpha} \cdot \sin(\delta_A/\alpha) + \varphi_B \cdot |G^*_B|^{1/\alpha} \cdot \sin(\delta_B/\alpha)]^2 \end{array} \right\}^{\alpha/2} \quad (5a)$$

$$\delta(\omega) = \alpha \cdot \tan^{-1}\left(\frac{\varphi_A \cdot |G^*_A|^{1/\alpha} \cdot \sin(\delta_A/\alpha) + \varphi_B \cdot |G^*_B|^{1/\alpha} \cdot \sin(\delta_B/\alpha)}{\varphi_A \cdot |G^*_A|^{1/\alpha} \cdot \cos(\delta_A/\alpha) + \varphi_B \cdot |G^*_B|^{1/\alpha} \cdot \cos(\delta_B/\alpha)}\right) \quad (5b)$$

The storage modulus, $G'(\omega)$, and loss modulus, $G''(\omega)$, of the blend are then calculated from eq. (6) below:

$$G'(\omega) = |G^*(\omega)| \cdot \cos(\delta) \quad (6a)$$

$$G''(\omega) = |G^*(\omega)| \cdot \sin(\delta) \quad (6b)$$

In the event that the rheology of one of the components, for example, component B, needs to be calculated from the known rheology of the blend and the rheology of component A, eq. (1) can be rearranged to give:

$$(G^*_B(\omega))^{1/\alpha} = \frac{-\varphi_A}{\varphi_B} \cdot (G^*_A(\omega))^{1/\alpha} + \frac{1}{\varphi_B} \cdot (G^*(\omega))^{1/\alpha} \text{ or} \quad (7)$$

$$(G^*_B(\omega))^{1/\alpha} = \psi_A \cdot (G^*_A(\omega))^{1/\alpha} + \psi \cdot (G^*(\omega))^{1/\alpha} \quad (8)$$

$$\text{with: } \psi_A = \frac{-\varphi_A}{\varphi_B} \text{ and } \psi = \frac{1}{\varphi_B} \quad (9)$$

The derivations for the storage modulus, $G_B'(\omega)$, and loss modulus, $G_B''(\omega)$, follow similarly as eqs. (5-6):

$$|G^*_B(\omega)| = \left\{ \begin{array}{l} [\psi_A \cdot |G^*_A|^{1/\alpha} \cdot \cos(\delta_A/\alpha) + \psi \cdot |G^*|^{1/\alpha} \cdot \cos(\delta/\alpha)]^2 + \\ [\psi_A \cdot |G^*_A|^{1/\alpha} \cdot \sin(\delta_A/\alpha) + \psi \cdot |G^*|^{1/\alpha} \cdot \sin(\delta/\alpha)]^2 \end{array} \right\}^{\alpha/2} \quad (10a)$$

$$\delta_B(\omega) = \alpha \cdot \tan^{-1}\left(\frac{\psi_A \cdot |G^*_A|^{1/\alpha} \cdot \sin(\delta_A/\alpha) + \psi \cdot |G^*|^{1/\alpha} \cdot \sin(\delta/\alpha)}{\psi_A \cdot |G^*_A|^{1/\alpha} \cdot \cos(\delta_A/\alpha) + \psi \cdot |G^*|^{1/\alpha} \cdot \cos(\delta/\alpha)}\right) \quad (10b)$$

$$G'_B(\omega) = |G^*_B(\omega)| \cdot \cos(\delta_B) \quad (11a)$$

$$G''_B(\omega) = |G^*_B(\omega)| \cdot \sin(\delta_B) \quad (11b)$$

Thus, it is apparent that the rheological polydispersity of all components of even a resin produced using two reactors configured in series can be estimated from the above calculations.

The preceding examples are meant only as illustrations. The following claims define the invention.

We claim:

1. A resin comprising a relatively high-density, low-molecular-weight polyethylene component and a relatively low-density, high-molecular-weight ethylene copolymer component, wherein the resin is produced in first and second slurry-tank reactors operating in parallel at a temperature within the range of about 60° C. to about 120° C., wherein ethylene polymerizes in the first reactor in the presence of a Ziegler-Natta catalyst and an optional 1-olefin comonomer to provide the high-density polyethylene component, and wherein additional ethylene polymerizes in the second reactor in the presence of a silane-modified Ziegler-Natta catalyst and a 1-olefin comonomer to provide the low-density ethylene copolymer component, said high and low-density components being blended to provide the resin, wherein the rheological polydispersity of the high-density component exceeds that of the resin.

2. The resin of claim 1 having enhanced environmental stress crack resistance compared with that of a conventional ethylene copolymer resin of similar density and melt index.

3. The resin of claim 1 having enhanced stiffness compared with that of a conventional ethylene copolymer resin of similar melt index and environmental stress crack resistance.

4. The resin of claim 1 wherein the high-molecular-weight component incorporates a greater wt. % of 1-olefin comonomer than the low-molecular-weight component.

5. The resin of claim 1 having a density within the range of 0.93 to 0.96 g/cm$^3$.

6. A multi-component resin of claim 1 that is essentially free of components having both a lower weight average molecular weight and a lower rheological polydispersity than that of any other resin component.

7. A multi-component resin of claim 1 that is essentially free of components having both a higher density and a lower rheological polydispersity than that of any other resin component.

8. An injection molded, blow molded, compression molded, or rotomolded article made from the resin of claim 1.

9. A film, extrusion coating, pipe, sheet, or fiber made from the resin of claim 1.

* * * * *